United States Patent Office 2,863,639
Patented Dec. 9, 1958

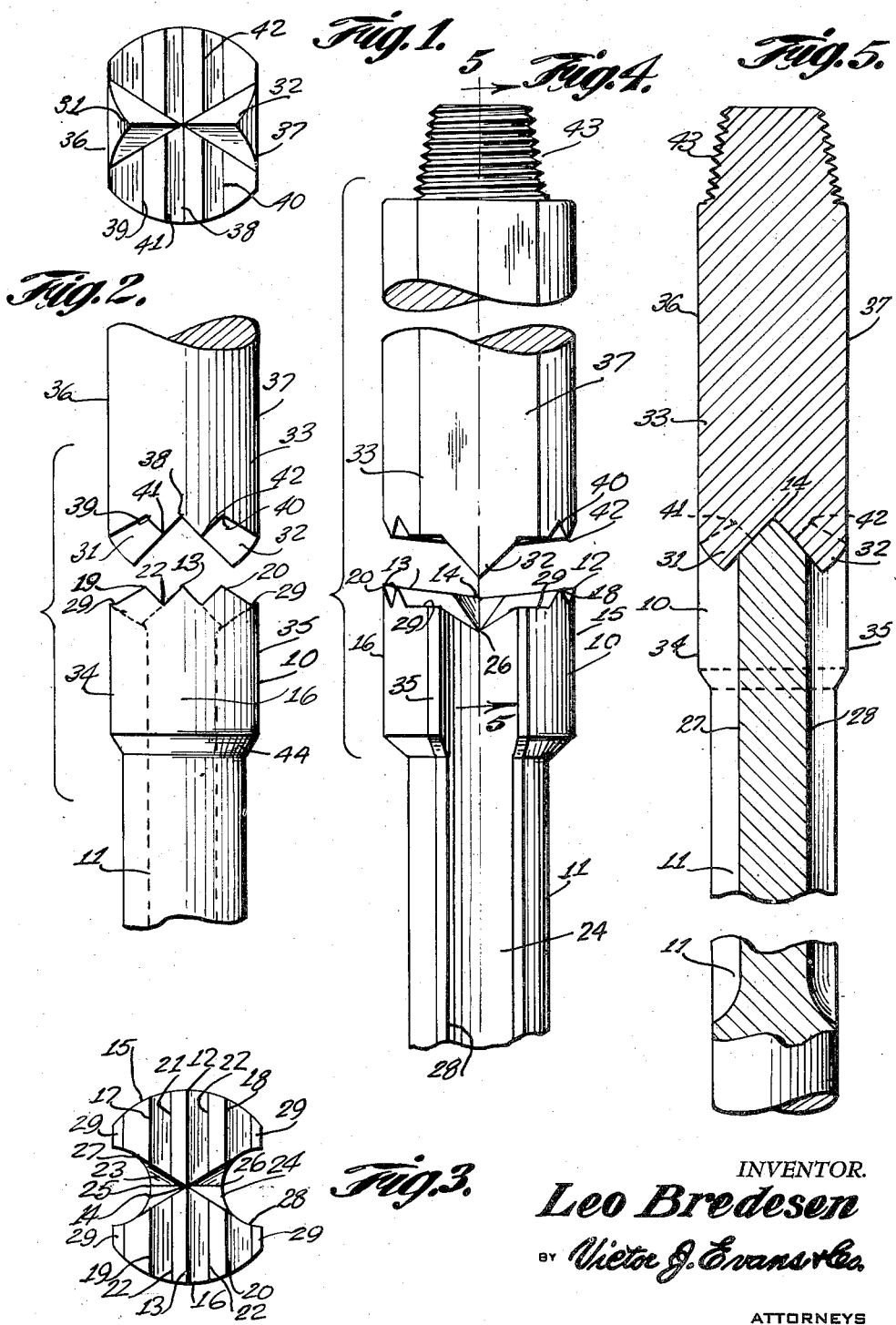

2,863,639

CONCAVE MULTIPLE CUTTING EDGE ROCK DRILL BIT AND DIE

Leo Bredesen, Greenwood, Wis.

Application August 9, 1955, Serial No. 527,349

1 Claim. (Cl. 255—64)

This invention relates to rock and well drilling machinery and equipment, and in particular, a multiple cutting edge bit having a concave face and adapted to be manufactured and sharpened by swaging a cylindrical forged steel body with a print or die and wherein V-shaped cutting portions of the print cut and swedge material from the center of the bit and between the cutting edges.

The drill bit is an improvement over the drill bit disclosed in my prior patent, No. 2,689,491, dated September 21, 1954, in that the face of the drill bit is concave and V-shaped notches lead from the axial center of the bit radially to flutes or grooves extended longitudinally through side surfaces of the bit causing the material of the bit on opposite sides of the center to spread whereby an accumulation of metal at the center is eliminated.

Rock drill bits and various types of well-digging drills have been formed of various designs and such bits have been provided with cutting edges of different shapes and patterns. Drills for cutting rock and the like are subjected to severe abuse and the life of the sharp cutting edges is comparatively short. With this thought in mind, this invention contemplates a drill bit and a print or die for forming cutting surfaces in the face of the bit in which the cutting edges are supported adjacent peripheral surfaces of the bit and relieved at the center whereby the load is taken at points spaced from the center and between the center and the periphery.

The object of this invention is, therefore, to provide a drill bit having spaced parallel V-shaped cutting edges in which the cutting edges extended continuously across the face of the bit.

Another object of the invention is to provide an improved rock drill bit in which the face of the bit is concave so that those portions of the cutting edges of the bit to which the larger portion of the force is applied are spaced outwardly from the center.

A further object of the invention is to provide a rock drill bit having reinforced continuous cutting edges in which the bit is of a simple and economical construction.

With these and other objects and advantages in view, the invention embodies a drill bit having a shank with a substantially cylindrical head and with longitudinally disposed flutes or chip carrying channels extended through the head and shank, and wherein the face of the bit is provided with V-shaped cutting edges with open notches V-shaped in cross section extended from the center and with intermediate portions providing lands at the sides of the grooves and also between the V-shaped cutting edges and grooves.

Other features and advantages of the invention will appear from the following description, taken in connection with the drawing, wherein:

Figure 1 is a view looking upwardly toward the lower end of the print or die with other parts omitted.

Figure 2 is a side elevational view showing the lower end of the die and cutting end of a bit, the parts being shown in spaced relation.

Figure 3 is an end elevational view showing the face of the bit illustrating the triangular shaped notches extended from the center and positioned in the intermediate parts at the sides of the cutting edges.

Figure 4 is a side elevational view of the die and bit also showing the parts separated, said view being taken from a point positioned at a right angle to that shown in Figure 2.

Figure 5 is a longitudinal section through the end of the bit and also through the print or die, said section being taken on line 5—5 of Figure 4.

Referring now to the drawing, wherein like reference characters denote corresponding parts, the improved rock drill bit of this invention includes a substantially cylindrical head 10, carried by a shank 11, with V-shaped cutting edges or ridges 12 and 13 extended from a center 14 to the peripheral surfaces 15 and 16 and V-shaped cutting edges 17 and 18 at one side of the center and spaced from the edge 12 and 19 and 20 at the opposite side and spaced from the edge 13. Between the cutting edges 12 and 17 is a V-shaped valley 21, and similar valleys 22 are provided between the edges 12 and 18, 13 and 19, and 13 and 20.

The bit is also provided with longitudinally disposed triangular shaped oppositely positioned notches 23 and 24 that extend from the center 14 to points 25 and 26 in the roots of longitudinally disposed grooves or chip carrying channels 27 and 28 that extend into the outer surfaces of the shank 11, and head 10. The end surfaces of the lands between the grooves 27 and 28 and the side surfaces of the V-shaped cutting edges are provided with tips 29. The tips 29 are flat surfaces between the inclined surfaces of the cutting edges 19 and 20 and the peripheral surface of the head. The inclined surfaces of the cutting edges 19 and 20 intercept the flat end surface of the head at points spaced inwardly from the flat side surfaces 35, as shown in Figs. 2 and 3.

The notches 23 and 24 are swaged by sections 31 and 32 of a print or die 33 which also forms the cutting edges 12, 17 and 18, and the valleys 21 and 22. The bit is provided with flat sides 34 and 35, and similar flat sides 36 and 37 of the print or die are positioned to register with the sides of the bit, thereby making it possible to align the drill bit with the print or pattern. The face of the print includes V-shaped recesses 38, 39 and 40 to correspond with the cutting edges 12, 17 and 18, respectively, and V-shaped teeth 41 and 42, to register with the valleys 21 and 22 of the bit.

A drill bit for a head 10 includes a cylindrical body having oppositely disposed parallel flat surfaces, as indicated by the numerals 34 and 35 and the longitudinally disposed grooves or chip carrying channels 27 and 28 are positioned in the centers of these flat surfaces thereby providing narrow sections between the sides of the grooves and points of intersection between the flat surfaces and periphery of the bit or head and these narrow surfaces are indicated by the numeral 29.

The upper end of the die is provided with a threaded conical-shaped stud 43 for attaching the die to a hammer or the like of a machine. The die or print may, however, be mounted by other suitable means.

With the parts as shown and described the die or print is secured in a reciprocating hammer and a piece of material for a bit is secured in a bed or base of a machine in alignment with the die, and upon reciprocation of the die the face of the bit is forged or formed as shown.

The bit formed as illustrated is provided with a concave face and with the material from the notches 23 and 24 swaged outwardly by the sections 31 and 32 of the die the accumulation of the material at the center is dispersed providing an efficient cutting face. The vertexes of the V-shaped cutting teeth or ridges of the drill are inclined inwardly from the points 12 and 13 to the point 14 at the center providing a concave cutting face on the end of the drill bit or head and with peripheral portions of the cutting teeth or ridges extended beyond the center of the drill bit or head the striking force of the drill bit is taken by material close to the peripheral edge of the head whereby the force of the impact is spread over the end of the head instead of being taken by the center of the drill as is usual. The life of a drill bit operating in hard granite is extended as the striking force is distributed over the face of the drill bit.

It will be understood that modifications within the scope of the appended claim may be made in the design and arrangement of the parts without departing from the spirit of the invention.

What is claimed is:

In a rock drill, the combination which comprises a cylindrical body providing a head having a rock drilling face on one end and a shank, the diameter of which is less than that of the head extended from the opposite end, the cylindrical head and shank having oppositely disposed substantially semi-circular shaped chip carrying channels extended longitudinally therethrough, the chip carrying channels being positioned in a longitudinally disposed plane extended through the axis of the drill head, the end of the chip carrying channels at the tip of the drill head blending into triangular-shaped grooves the vertexes of which terminate on the axis of the drill head, the cutting face of the drill head including a V-shaped ridge extended across the end surface of the head and through the longitudinal axis thereof, and additional V-shaped ridges spaced from the ridge extended through the longitudinal axis of the head and parallel thereto, the said triangular-shaped grooves at the ends of the chip carrying channels separating inner ends of the said additional V-shaped ridges, the vertexes of the V-shaped ridges being inclined inwardly from the periphery of the drill head to a point at the center or on the longitudinal axis providing a concave end surface on the cutting end of the drill head whereby the striking force is applied at the peripheral edge of the drill head thereby relieving the force at the center.

References Cited in the file of this patent

UNITED STATES PATENTS

| | | |
|---|---|---|
| 48,785 | Bickel | July 18, 1865 |
| 791,264 | Hardsocg | May 30, 1905 |
| 1,580,872 | Watson | Apr. 13, 1926 |
| 1,764,989 | Signell et al. | June 17, 1930 |
| 2,191,493 | Reilly | Feb. 27, 1940 |
| 2,597,301 | Curtis | May 20, 1952 |
| 2,641,446 | Haglund et al. | June 9, 1953 |

FOREIGN PATENTS

| | | |
|---|---|---|
| 304,982 | Germany | Apr. 13, 1916 |